(12) United States Patent
Nakao

(10) Patent No.: US 8,096,590 B2
(45) Date of Patent: Jan. 17, 2012

(54) CONNECTING STRUCTURE FOR PIPING

(75) Inventor: Kazushi Nakao, Kanagawa-ken (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/082,281

(22) Filed: Apr. 7, 2011

(65) Prior Publication Data

US 2011/0248496 A1    Oct. 13, 2011

(30) Foreign Application Priority Data

Apr. 7, 2010 (JP) .................................. 2010-088602

(51) Int. Cl.
*F16L 19/00* (2006.01)

(52) U.S. Cl. ......... 285/354; 285/104; 285/105; 285/386

(58) Field of Classification Search .......... 285/104–105, 285/354, 386–387
See application file for complete search history.

(56) References Cited

U.S. PATENT DOCUMENTS

| | | | | |
|---|---|---|---|---|
| 1,075,693 A | * | 10/1913 | Cassidy | 285/281 |
| 2,300,584 A | * | 11/1942 | Martin | 285/234 |
| 2,354,538 A | * | 7/1944 | Parker | 285/234 |
| 2,459,609 A | * | 1/1949 | Wolfram | 285/349 |
| 2,511,134 A | * | 6/1950 | Stranberg | 285/342 |
| 3,075,792 A | * | 1/1963 | Franck | 285/148.27 |
| 3,898,163 A | * | 8/1975 | Mott | 210/246 |
| 3,986,730 A | * | 10/1976 | Martelli et al. | 285/23 |
| 6,572,155 B2 | * | 6/2003 | Dehmer | 285/334.5 |
| 2002/0047265 A1 | * | 4/2002 | Karhu et al. | 285/125.1 |
| 2003/0197380 A1 | * | 10/2003 | Chelchowski et al. | 285/354 |
| 2004/0169370 A1 | * | 9/2004 | Chelchowski et al. | 285/249 |

FOREIGN PATENT DOCUMENTS

| | | |
|---|---|---|
| JP | 2004-211811 | 7/2004 |
| JP | 2005-147549 | 6/2005 |

* cited by examiner

*Primary Examiner* — Aaron Dunwoody
*Assistant Examiner* — Fannie Kee
(74) *Attorney, Agent, or Firm* — Thorpe North & Western LLP

(57) ABSTRACT

A seal material and a washer are fitted on a piping main body of a first piping, a bead portion is inserted into a bead portion insertion hole and the seal material and the washer are inserted into a seal material insertion hole. In this state, a female screw is threaded onto a male screw until a piping side stopper and a nut side stopper are abutted, and the nut member is joined to a piping side tube portion. In a state where the piping side stopper and the nut side stopper are abutted, the seal material is compressed in an axial direction via the washer by the small diameter tube portion and the seal material pressure-contact surface. The seal material is elastically joined to an outer circumferential surface of the piping main body and an inner circumferential surface of the bead portion insertion hole in a radial direction.

17 Claims, 5 Drawing Sheets

CONNECTING STRUCTURE FOR PIPING

PRIORITY CLAIM

Priority is claimed to Japan Patent Application Serial No. 2010-088602 filed on Apr. 7, 2010.

BACKGROUND

1. Technical Field

The present technology relates to a connecting structure for piping used for fluids such as water, gases, and the like.

2. Related Art

When pipes provided with bead portions at ends thereof that expand toward an outer side in a radial direction are connected with each other, edges of a rubber hose can be fitted to both of ends of the pipes, and a band can be used to fasten a location of the rubber hose that is fitted to both of the pipes (Japanese Unexamined Patent Application Publication No. 2004-211811 and Japanese Unexamined Patent Application Publication No. 2005-147549).

However, with the configuration described above in which fastening is performed using a band, there is a risk that a fluid will leak from the juncture at which the rubber hose has been utilized due to variations in fastening of the band by personnel. Particularly, when the juncture is disposed at a location in a device that is difficult to access, repairing the juncture becomes a troublesome task.

The present technology was devised in light of the problems described above. An object of the present technology is to provide a connecting structure for piping whereby variations in connecting work can be prevented and fluid leakage can be reliably prevented.

SUMMARY

The present technology provides a connecting structure for piping including a second piping that connects to a first piping provided, at an end of a piping main body, with a bead portion expanding toward an outer side of a radial direction, wherein a piping side tube portion having a larger outer diameter than the piping main body that forms the second piping is provided at an end of a piping main body that forms the second piping. A piping side stopper is provided in the piping side tube portion, and a male screw is provided on an peripheral portion of the piping side tube portion. A bead portion insertion hole, into which the bead portion is insertable on the same axis as the piping side tube portion, is provided on an inner circumference of the piping side tube portion close to the piping main body. A seal material insertion hole having a larger diameter than the bead portion insertion hole that is open to the end of the piping side tube portion is provided on the same axis as the bead portion insertion hole on an inner circumference of the piping side tube portion close to the end. An annular seal material pressure-contact surface, facing a direction of the end, is provided at a location that is a boundary between the bead portion insertion hole and the seal material insertion hole.

A nut member is provided including a large diameter tube portion having a female screw, threadable onto the male screw, formed on an inner circumferential surface. A small diameter tube portion having an inner circumferential surface through which the bead portion is insertable, is inserted into the seal material insertion hole by the female screw being threaded onto the male screw. A nut side stopper can be abuttable to the piping side stopper. The end portion having the bead portion of the piping main body of the first piping is inserted into the bead portion insertion hole. A seal material and a washer, which are fitted to a location of the piping main body located opposite the end of the piping main body of the first piping across from the bead portion, are inserted into the seal material insertion hole.

In this state, the nut member is joined with the piping side tube portion by the female screw being threaded onto the male screw until the piping side stopper and the nut side stopper are abutted. In a state where the piping side stopper and the nut side stopper are abutted, the seal material is compressed a proper amount in an axial direction via the washer by the small diameter tube portion and the seal material pressure-contact surface, and the seal material is elastically joined to the outer circumferential surface of the piping main body of the first piping and the inner circumferential surface of the bead portion insertion hole in the radial direction.

The piping connecting procedure is finished when the nut member is rotated until the piping side stopper and the nut side stopper are abutted. Therefore, piping connections can be reliably performed with no fluid leakage via a simple procedure and variations in the work by personnel will not occur.

DETAILED DESCRIPTION

An embodiment of the present technology is described below based on the drawings.

Figure 1:
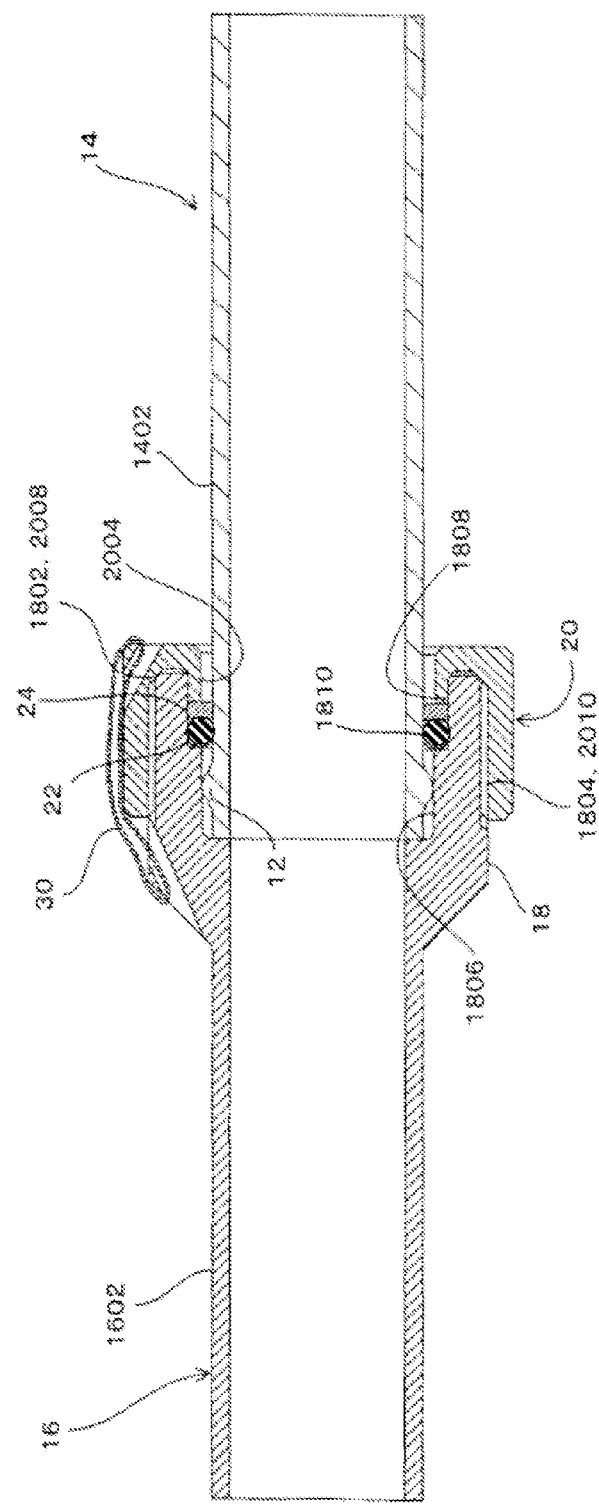
FIG. 1 is a cross-sectional view illustrating the piping in a connected state.
Figure 2:
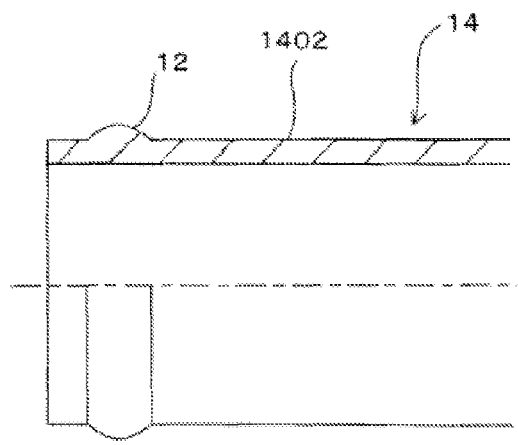
FIG. 2 is a front view of a half cross-section of a first piping having a bead portion.

As illustrated in FIG. 1 and FIG. 2, an embodiment of the present technology is applied to a structure in which a first piping 14 provided, at an end of a piping main body 1402, with a bead portion 12 expanding toward an outer side of a radial direction, is connected to a second piping 16.

The piping main body 1402 of the first piping 14 and a piping main body 1602 of the second piping 16 are formed with inner diameters and outer diameters of substantially identical dimensions. The inner diameters and the outer diameters of the piping main bodies 1402 and 1602 are formed having uniform dimensions along a longitudinal direction.

A piping side tube portion 18 having a larger diameter than the piping main body 1602 is provided at an end of the piping main body 1602 that forms the second piping 16. Additionally, a nut member 20, a seal material 22, and a washer 24 are provided.

Figure 3:
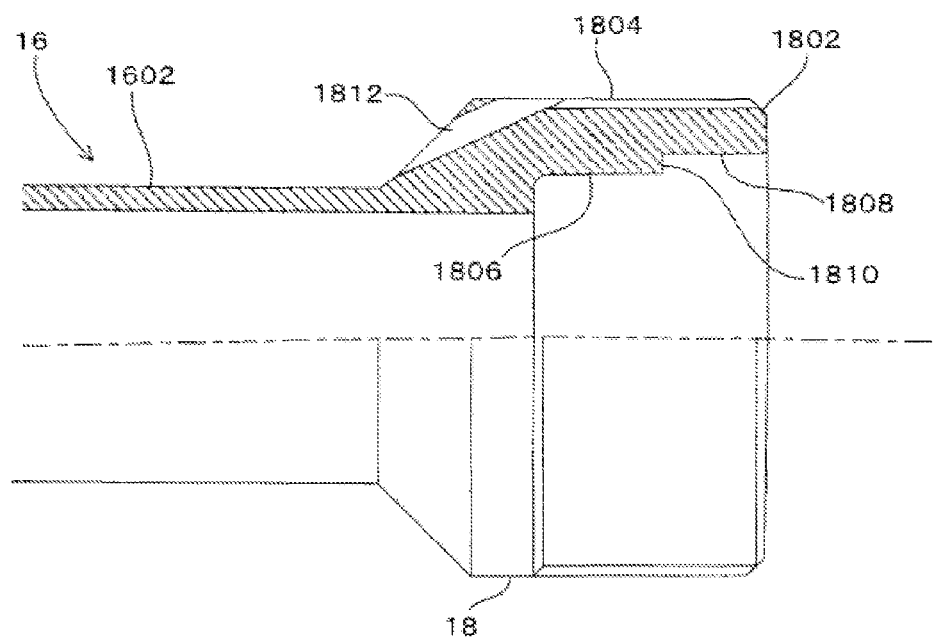
FIG. 3 is a front view of a half cross-section of a second piping that is provided with a piping side tube portion.

As illustrated in FIG. 3, a piping side stopper 1802, a male screw 1804, a bead portion insertion hole 1806, a seal material insertion hole 1808, and a seal material pressure-contact surface 1810 are provided in the piping side tube portion 18.

The piping side stopper 1802 is provided on an end of the piping side tube portion 18 located opposite the piping main body 1602 that forms the second piping 16.

The male screw 1804 is provided on an outer circumferential surface of the piping side tube portion 18.

The bead portion insertion hole 1806 is provided on the same axis as the piping side tube portion 18 on an inner circumference of the piping side tube portion 18 close to the piping main body 1602, having an inner diameter that allows the bead portion 12 to be insertable.

The seal material insertion hole 1808 is provided on the inner circumference of the piping side tube portion 18 close to the end, and is provided with an inner diameter larger than the bead portion insertion hole 1806 that allows the seal material 22 to be insertable.

The seal material pressure-contact surface 1810 is provided annularly, facing an end direction of the piping side tube portion 18, at a location that is a boundary between the bead portion insertion hole 1806 and the seal material insertion hole 1808.

Additionally, a plurality of through holes 1812 that allows insertion of a rotation prevention member 30 is provided at the end close to the piping main body 1602 of the piping side tube portion 18.

Figure 4A:
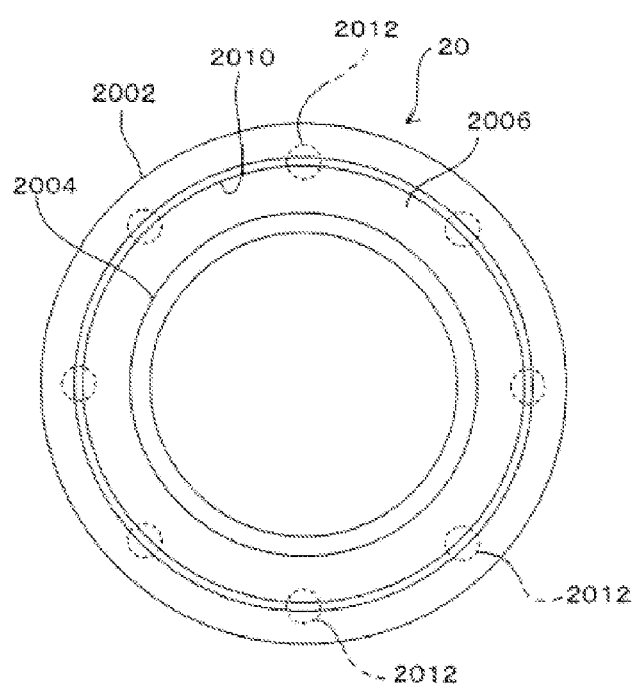
FIG. 4A is a front view of a nut member and FIG. 4B is a side view of the same half cross-section.
Figure 4B:
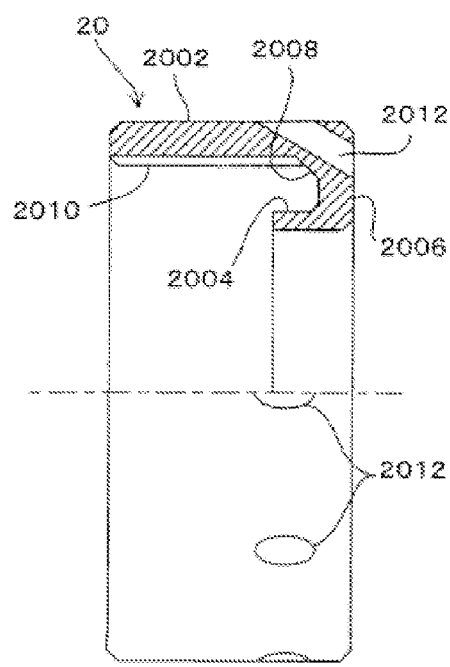

As illustrated in FIG. 4, a large diameter tube portion 2002, a small diameter tube portion 2004, an end wall portion 2006, and a nut side stopper 2008 are provided in the nut member 20.

A female screw 2010 that is threadable onto the male screw 1804 is provided on an inner circumferential surface of the large diameter tube portion 2002.

The small diameter tube portion 2004 is provided on an inner side in a radial direction of the large diameter tube portion 2002, and includes an inner circumferential surface that allows the bead portion 12 to pass through and an outer circumferential surface that is insertable into the seal material insertion hole 1808. The small diameter tube portion 2004 is inserted into the seal material insertion hole 1808 by the threading of the female screw 2010 onto the male screw 1804.

The end wall portion 2006 connects an end in an axial direction of the large diameter tube portion 2002 and an end in the axial direction of the small diameter tube portion 2004.

The nut side stopper 2008 is provided abuttable to the piping side stopper 1802 in the end wall portion 2006. In a state where the nut side stopper 2008 is abutted to the piping side stopper 1802, the seal material 22 that is fitted to the piping main body 1402 is compressed a proper amount in the axial direction via the washer 24 by the small diameter tube portion 2004 and the seal material pressure-contact surface 1810.

Additionally, the plurality of through holes 2012 for allowing insertion of the rotation prevention member 30 are provided at intervals in the circumferential direction throughout a location close to the end wall portion 2006 of the large diameter tube portion 2002 and throughout the end wall portion 2006.

A variety of conventionally known objects such as O-rings and the like can be used for the seal material 22.

Additionally, a variety of conventionally known objects such as a washer provided with a slit can be used for the washer 24. Using the washer 24 is beneficial because, when compressing the seal material 22 in the axial direction, the small diameter tube portion 2004 will contact the washer 24, and as a result, a rotating operation of the nut member 20 will be performed smoothly, damage to the seal material 22 will be prevented, and the durability of the seal material 22 will be enhanced.

Additionally, in cases in which the connecting structure of the present technology is applied to a location where an axial directional force operates in a direction in which the first piping 14 and the second piping 16 separate, using the washer 24 having an inner diameter with a smaller dimension than the outer diameter of the bead portion 12 is beneficial because dislocation of the first piping 14 and the second piping 16 is prevented.

The first piping 14, the second piping 16, and the nut member 20 may be made of metal or synthetic resin.

Connecting of the first piping 14 and the second piping 16 is performed as described below.

The seal material 22 and the washer 24 are fitted at a location of the piping main body 1402 positioned opposite from the end of the first piping 14, across from the bead portion 12, the seal material 22 being positioned closer to the bead portion 12 than the washer 24.

In this state, the bead portion 12 is inserted into the bead portion insertion hole 1806 and the seal material 22 and the washer 24 are inserted into the seal material insertion hole 1808.

Moreover, the female screw 2010 is threaded onto the male screw 1804 and the nut member 20 is rotated until the piping side stopper 1802 and the nut side stopper 2008 are abutted. Due to the rotation of the nut member 20, the small diameter tube portion 2004 is inserted into the seal material insertion hole 1808 and the seal material 22 is compressed in the axial direction via the washer 24 by the small diameter tube portion 2004 and the seal material pressure-contact surface 1810.

When the piping side stopper 1802 and the nut side stopper 2008 are abutted, the rotation of the nut member 20 is stopped, and the rotation prevention member 30 made from, for example, a chain or the like, is inserted through the through holes 1812 of the piping side tube portion 18 and the through holes 2012 of the nut member 20, thus preventing rotation of the nut member 20. This state is illustrated in FIG. 1.

In the state where the piping side stopper 1802 and the nut side stopper 2008 are abutted, the amount of compression of the seal material 22 in the axial direction is positioned in the range of the design value, the seal material 22 is compressed a proper amount, and the outer circumferential surface of the piping main body 1402 of the first piping 14 and the inner circumferential surface of the bead portion insertion hole 1806 are elastically joined in the radial direction.

Thus, the seal material 22 is elastically joined at a proper amount to the outer circumferential surface of the piping main body 1402 and the inner circumferential surface of the bead portion insertion hole 1806, and the water-tightness or air-tightness of the junction of the first piping 14 and the second piping 16 is maintained.

Therefore, according to the present embodiment, because it is sufficient that the nut member 20 be rotated until the piping side stopper 1802 and the nut side stopper 2008 are abutted, joining of piping can be reliably performed via a simple procedure and, moreover, variations in the procedure caused by personnel will not occur.

What is claimed is:

1. A connecting structure for piping comprising a first piping provided, at an end portion of a piping main body, with a bead portion expanding toward an outer side of a radial direction, the first piping being connected to a second piping, wherein
a piping side tube portion, having a larger outer diameter than a piping main body that forms the second piping, is provided at an end of the piping main body that forms the second piping;
a piping side stopper is provided in the piping side tube portion and a male screw is provided on a peripheral portion of the piping side tube portion;
a bead portion insertion hole, into which the bead portion is insertable on the same axis as the piping side tube portion, is provided on an inner circumference of the piping side tube portion close to the piping main body; a seal material insertion hole having a larger diameter than the bead portion insertion hole that is open to the end of the piping side tube portion is provided on the same axis as the bead portion insertion hole on an inner circumference of the piping side tube portion close to the end; and an annular seal material pressure-contact surface, facing a direction of the end, is provided at a location that is a boundary between the bead portion insertion hole and the seal material insertion hole;

a nut member is provided including a large diameter tube portion having a female screw, threadable onto the male screw, formed on an inner circumferential surface; a small diameter tube portion having an inner circumferential surface through which the bead portion is insertable, and that is inserted into the seal material insertion hole by the female screw being threaded onto the male screw; and a nut side stopper that is abuttable to the piping side stopper;

the end portion having the bead portion of the piping main body of the first piping is inserted into the bead portion insertion hole; a seal material and a washer, which are fitted to a location of the piping main body located opposite the end of the piping main body of the first piping across from the bead portion, are inserted into the seal material insertion hole; and, in this state, the nut member is joined with the piping side tube portion by the female screw being threaded onto the male screw until the piping side stopper and the nut side stopper are abutted;

wherein in the state where the piping side stopper and the nut side stopper are abutted, the seal material is compressed in an axial direction via the washer by the small diameter tube portion and the seal material pressure-contact surface; and the seal material is elastically joined to the outer circumferential surface of the piping main body of the first piping and the inner circumferential surface of the bead portion insertion hole in the radial direction;

and further comprising a plurality of through holes in the piping side tube portion and in the nut member; and a rotation prevention member at an end close to the piping main body of the piping side tube portion;

wherein the plurality of through holes enable insertion of the rotation prevention member and are arranged at intervals in a circumferential direction throughout a location close to an end wall portion of the large diameter tube portion and throughout the end wall portion.

2. The connecting structure for piping according to claim 1, wherein in the state where the piping side stopper and the nut side stopper are abutted, the rotation prevention member prevents rotation of the nut member with respect to the piping side tube portion between the piping side tube portion and the nut member.

3. The connecting structure for piping according to claim 1, wherein the nut member comprises the end wall portion that connects an end in the axial direction of the large diameter tube portion and an end in the axial direction of the small diameter tube portion, the piping side stopper is provided at the end of the piping side tube portion, and the nut side stopper is provided in the end wall portion.

4. The connecting structure for piping according to claim 3, wherein in the state where the piping side stopper and the nut side stopper are abutted, the rotation prevention member prevents rotation of the nut member with respect to the piping side tube portion between the piping side tube portion and the nut member.

5. The connecting structure for piping according to claim 3, wherein an inner diameter of the washer is formed having smaller dimensions than an outer diameter of the bead portion.

6. The connecting structure for piping according to claim 1, wherein an inner diameter of the washer is formed having smaller dimensions than an outer diameter of the bead portion.

7. The connecting structure for piping according to claim 1, wherein the piping main body of the first piping and a piping main body of the second piping are formed having inner diameters and outer diameters of identical dimensions.

8. The connecting structure for piping according to claim 1, wherein inner diameters and outer diameters of the piping main body of the first piping and the piping main body of the second piping are formed having uniform dimensions along a longitudinal direction.

9. The connecting structure for piping according to claim 1, wherein the rotation prevention member comprises a chain.

10. The connecting structure for piping according to claim 1, wherein the small diameter tube portion is provided on an inner side in a radial direction of the large diameter tube portion, and includes an inner circumferential surface that allows the bead portion to pass through and an outer circumferential surface that is insertable into the seal material insertion hole.

11. The connecting structure for piping according to claim 1, wherein the end wall portion connects an end in an axial direction of the large diameter tube portion and an end in the axial direction of the small diameter tube portion.

12. The connecting structure for piping according to claim 1, wherein the seal material comprises an O-ring.

13. The connecting structure for piping according to claim 1, wherein the washer comprises a washer having a slit formed therein.

14. The connecting structure for piping according to claim 1, wherein the first piping, the second piping, and the nut member are made from a metal.

15. The connecting structure for piping according to claim 1, wherein the first piping, the second piping, and the nut member are made from a synthetic resin.

16. A method for connecting a first piping and a second piping using the connecting structure for piping according to claim 1, comprising:

fitting the seal material and the washer at a location of the piping main body of the first piping positioned opposite from the end of the first piping, across from the bead portion, the seal material being positioned closer to the bead portion than the washer;

inserting the bead portion into the bead portion insertion hole and inserting the seal material and the washer into the seal material insertion hole;

threading the female screw onto the male screw and rotating the nut member until the piping side stopper and the nut side stopper are abutted to cause the small diameter tube portion to be inserted into the seal material insertion hole and to compress the seal material in the axial direction via the washer by the small diameter tube portion and the seal material pressure-contact surface; and elastically joining the outer circumferential surface of the piping main body of the first piping and the inner circumferential surface of the bead portion insertion hole in the radial direction.

17. The method according to claim 16, further comprising inserting the rotation prevention member through the plurality of through holes in the piping side tube portion and in the nut member to preventing rotation of the nut member.

* * * * *